(12) United States Patent
Ernst

(10) Patent No.: US 10,815,929 B2
(45) Date of Patent: Oct. 27, 2020

(54) SYSTEMS AND METHODS FOR WASTE HEAT RECOVERY FOR INTERNAL COMBUSTION ENGINES

(71) Applicant: Cummins Inc., Columbus, IN (US)

(72) Inventor: Timothy C. Ernst, Columbus, IN (US)

(73) Assignee: Cummins Inc., Columbus, IN (US)

( * ) Notice: Subject to any disclaimer, the term of this patent is extended or adjusted under 35 U.S.C. 154(b) by 147 days.

(21) Appl. No.: 16/025,485

(22) Filed: Jul. 2, 2018

(65) Prior Publication Data

US 2019/0010893 A1 Jan. 10, 2019

Related U.S. Application Data

(60) Provisional application No. 62/528,709, filed on Jul. 5, 2017.

(51) Int. Cl.
| | |
|---|---|
| *F02G 5/02* | (2006.01) |
| *F01K 7/16* | (2006.01) |
| *F01P 3/20* | (2006.01) |
| *F01K 23/06* | (2006.01) |
| *F01K 23/10* | (2006.01) |

(52) U.S. Cl.
CPC .................. *F02G 5/02* (2013.01); *F01K 7/16* (2013.01); *F01K 23/065* (2013.01); *F01K 23/10* (2013.01); *F01P 3/20* (2013.01); *F01P 2060/04* (2013.01); *Y02T 10/166* (2013.01)

(58) Field of Classification Search
CPC ........ F01K 23/06; F01K 23/065; F01K 23/10; Y02T 10/166; F01P 3/20
See application file for complete search history.

(56) References Cited

U.S. PATENT DOCUMENTS

| | | | | |
|---|---|---|---|---|
| 3,888,084 A | * | 6/1975 | Hawkins | F01K 23/065 60/614 |
| 4,055,948 A | * | 11/1977 | Kraus | F03G 6/067 60/641.8 |
| 5,351,487 A | * | 10/1994 | Abdelmalek | B60K 6/24 60/618 |

(Continued)

FOREIGN PATENT DOCUMENTS

| | | | | |
|---|---|---|---|---|
| EP | 1925806 A2 | * | 5/2008 | ........... F01K 23/065 |
| FR | 2868809 A1 | * | 10/2005 | ................ F01P 9/06 |
| WO | WO-2009030471 A2 | * | 3/2009 | ............. F01K 27/02 |

*Primary Examiner* — Laert Dounis
(74) *Attorney, Agent, or Firm* — Foley & Lardner LLP

(57) ABSTRACT

A waste heat recovery system comprises an exhaust system, a thermal oil circuit, and a Rankine cycle circuit. The exhaust system is configured to provide exhaust gases. The thermal oil circuit comprises a first heat exchanger and a second heat exchanger. The first heat exchanger is positioned along the exhaust system. The first heat exchanger receives heat from exhaust gases and separately receives thermal oil such that heat from exhaust gases is transferred to thermal oil within the first heat exchanger. The second heat exchanger receives thermal oil from the first heat exchanger and provides thermal oil to the first heat exchanger. The Rankine cycle circuit circulates working fluid through the second heat exchanger separate from thermal oil such that heat from thermal oil is transferred to working fluid within the second heat exchanger. An expander utilizes heat within working fluid to produce mechanical energy.

19 Claims, 5 Drawing Sheets

(56) References Cited

U.S. PATENT DOCUMENTS

| | | |
|---|---|---|
| 8,752,378 B2 | 6/2014 | Ernst et al. |
| 9,470,115 B2 | 10/2016 | Ernst et al. |
| 9,845,711 B2 | 12/2017 | Ernst et al. |
| 9,945,267 B2 * | 4/2018 | Adachi ................. F01K 23/065 |
| 10,323,548 B2 * | 6/2019 | Andersson .............. F01K 9/003 |
| 2009/0277173 A1 * | 11/2009 | Ernst ..................... F01K 23/065 60/616 |
| 2010/0018207 A1 * | 1/2010 | Juchymenko ......... F01K 23/065 60/670 |
| 2011/0094227 A1 * | 4/2011 | Ast ........................ F01K 25/08 60/671 |
| 2011/0192163 A1 * | 8/2011 | Kasuya .................. F01K 13/02 60/624 |
| 2012/0000201 A1 * | 1/2012 | Ast ........................ F01K 3/004 60/652 |
| 2015/0000274 A1 | 1/2015 | Ernst et al. |
| 2015/0013328 A1 * | 1/2015 | Carstensen .......... F01K 23/065 60/597 |
| 2017/0335745 A1 | 11/2017 | Benjamin et al. |
| 2017/0356321 A1 | 12/2017 | Ernst et al. |
| 2018/0135503 A1 | 5/2018 | Ernst et al. |

* cited by examiner

SYSTEMS AND METHODS FOR WASTE HEAT RECOVERY FOR INTERNAL COMBUSTION ENGINES

CROSS-REFERENCE TO RELATED APPLICATIONS

The present application claims priority to U.S. provisional patent application No. 62/528,709, filed on Jul. 5, 2017, the contents of which are incorporated herein by reference for all purposes.

TECHNICAL FIELD

The present application relates generally to the field of waste heat recovery systems for internal combustion engine systems.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." Waste heat recovery ("WHR") systems capture a portion of the waste heat to perform useful work. Some WHR systems utilize a Rankine cycle ("RC"). The RC is a thermodynamic process by which heat is transferred to a working fluid in an RC circuit. The working fluid is pumped into a heat exchanger, where it is vaporized. The vapor passes through an expander and then through a condenser, where the vapor is condensed back to a liquid. The expanding working fluid vapor causes a rotor in the expander to rotate, converting the waste heat energy to mechanical energy. The mechanical energy may be transmitted to engine system components, such as a pump, a compressor, a generator, and other similar devices.

SUMMARY

In a first set of embodiments, a waste heat recovery system comprises an exhaust system, a thermal oil circuit, and a Rankine cycle circuit. The exhaust system is configured to provide exhaust gases. The thermal oil circuit includes a first heat exchanger and a second heat exchanger. The first heat exchanger is positioned along the exhaust system. The first heat exchanger receives heat from the exhaust gases and separately receives thermal oil such that heat from the exhaust gases is transferred to the thermal oil within the first heat exchanger. The second heat exchanger receives the thermal oil from the first heat exchanger and provides the thermal oil to the first heat exchanger. The Rankine cycle circuit circulates the working fluid through the second heat exchanger separate from the thermal oil such that heat from the thermal oil is transferred to the working fluid within the second heat exchanger. The Rankine cycle circuit includes an expander that utilizes heat within the working fluid to produce mechanical energy.

In a second set of embodiments, a thermal oil circuit for a waste heat recovery system includes a first heat exchanger, a first conduit, a second heat exchanger, a second conduit, a valve, and a third conduit. The first heat exchanger is positioned along an exhaust system. The first heat exchanger receives heat from the exhaust system and separately receives thermal oil such that heat from the exhaust system is transferred to the thermal oil within the first heat exchanger. The first conduit is coupled to the first heat exchanger. The second heat exchanger is coupled to the first conduit. The second heat exchanger receives the thermal oil from the first heat exchanger via the first conduit. The second heat exchanger separately receives the working fluid such that heat from the thermal oil within the second heat exchanger is transferred to the working fluid. The second conduit is coupled to the second heat exchanger. The valve is coupled to the second conduit. The third conduit is coupled to the valve and to the first heat exchanger such that the thermal oil can be provided from the second heat exchanger, through the second conduit, the valve, and the third conduit.

In a third set of embodiments, a waste heat recovery system is provided. An exhaust system receives exhaust gases from an internal combustion engine. A thermal oil circuit comprises a first heat exchanger and a second heat exchanger. The first heat exchanger receives exhaust gases from the exhaust system and separately receives thermal oil such that heat from the exhaust gases is transferred to the thermal oil within the first heat exchanger. The second heat exchanger receives the thermal oil from the first heat exchanger and provides the thermal oil to the first heat exchanger. A coolant circuit comprises a radiator and a third heat exchanger. The radiator receives coolant from the internal combustion engine and provides the coolant to the third heat exchanger. The third heat exchanger provides the coolant to the second heat exchanger such that heat from the thermal oil within the second heat exchanger is transferred to the coolant. A Rankine cycle circuit comprises a pump and an expander. The pump is configured to circulate working fluid through the third heat exchanger such that heat from the coolant within the third heat exchanger is transferred to the working fluid. The expander utilizes heat within working fluid to produce mechanical energy.

In a fourth set of embodiments, a waste heat recovery system is provided. An exhaust system receives exhaust gases from an internal combustion engine. A thermal oil circuit comprises a first heat exchanger and a second heat exchanger. The first heat exchanger receives exhaust gases from the exhaust system and separately receives thermal oil such that heat from the exhaust gases is transferred to the thermal oil within the first heat exchanger. The second heat exchanger receives the thermal oil from the first heat exchanger and provides the thermal oil to the first heat exchanger. A coolant circuit comprises the second heat exchanger, a third heat exchanger, and a radiator. The second heat exchanger receives coolant from the internal combustion engine and provides coolant to the third heat exchanger such that heat from the thermal oil within the second heat exchanger is transferred to the coolant. The third heat exchanger provides the coolant to the radiator. The radiator providing the coolant to the internal combustion engine. A Rankine cycle circuit comprises a pump and an expander. The pump is configured to circulate working fluid through the third heat exchanger such that heat from the coolant within the third heat exchanger is transferred to the working fluid. The expander utilizes heat within the working fluid to produce mechanical energy.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
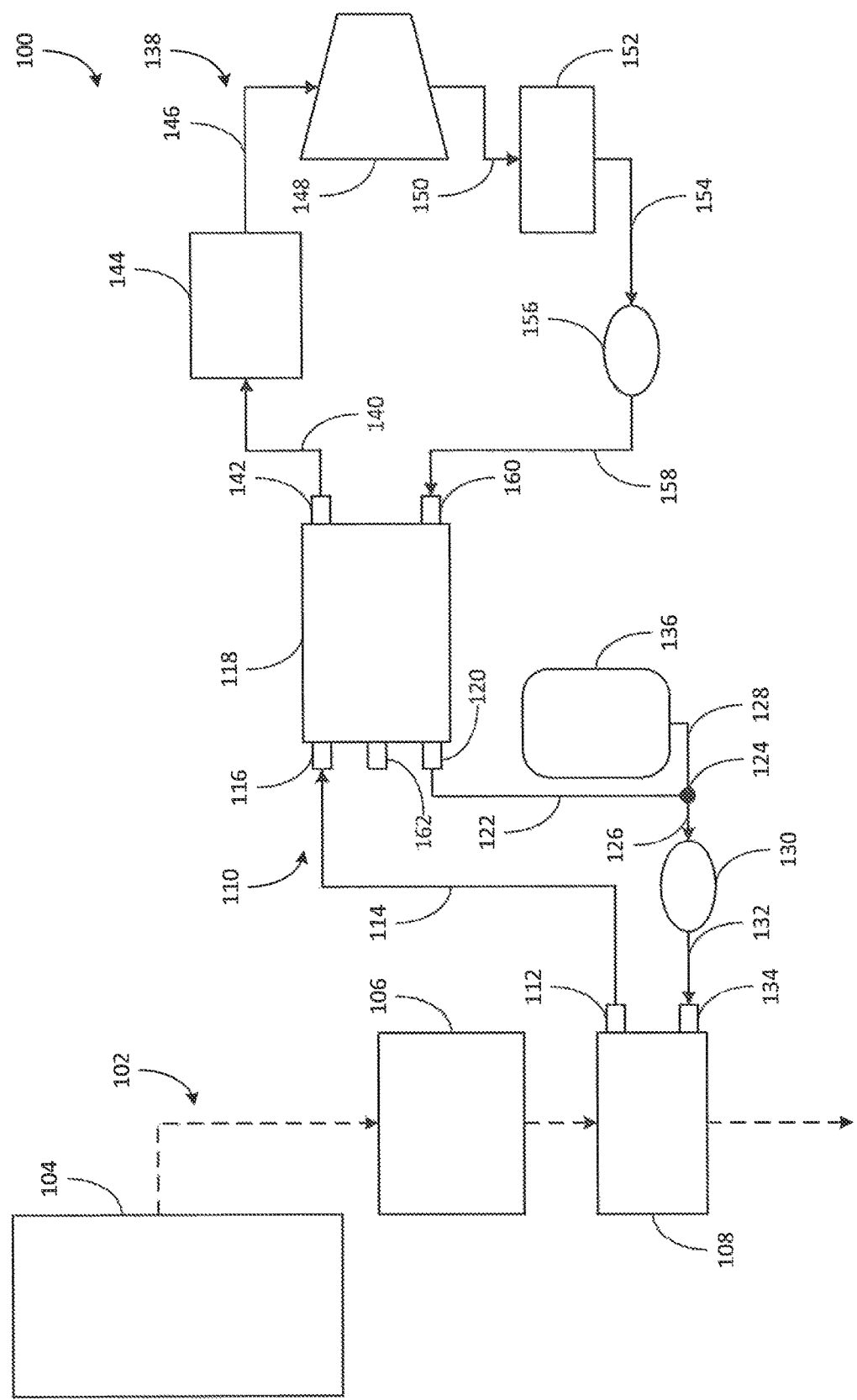
FIG. 1 is a block schematic diagram of an example WHR system having an example thermal oil circuit.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

The following are more detailed descriptions of various concepts related to, and implementations of, methods, apparatuses, and systems for a thermal oil circuit for use in a WHR system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce waste heat that is often converted, in part, into useful energy through the use of a WHR system. Internal combustion engines include several heat sources, such as exhaust gases, that reject heat to the atmosphere. Conventional WHR systems attempt to harvest this otherwise-wasted heat by transferring the heat to a fluid and then harnessing the energy stored in the fluid through the use of a rotor within an expander.

Conventional WHR systems (e.g., prime path WHR systems, etc.) recover heat directly from exhaust gases by passing the exhaust gases through a heat exchanger that provides the recovered heat to a working fluid. Conventional WHR systems include a three-way valve that is positioned along an exhaust path (i.e., leading from the internal combustion engine to a downstream component or portion of an exhaust system). The three-way valve is included because conventional WHR systems utilize a working fluid that cannot withstand prolonged exposure to heat, such as that which occurs during stagnation of the working fluid proximate to an exhaust system. In these situations, the working fluid tends to break down rendering operation of the conventional WHR systems undesirable.

These three-way valves are positioned between a first position, where the exhaust gases are provided from the internal combustion engine, through the three-way valve, and to the downstream component or portion of the exhaust system, and a second position, where the exhaust gases are provided from the internal combustion engine, through the three-way valve, and to a tailpipe exhaust gas heat exchanger included within the WHR system.

A substantial disadvantage of conventional WHR systems is the significant costs associated with the three-way exhaust gas valves. These costs often prohibit the implementation of WHR systems in many applications and therefore provide a barrier to increasing the efficiency of internal combustion engines in these applications. Another limitation of conventional WHR systems is that the three-way valves are often prone to functional and/or structural failures. For example, the three-way valves may become functionally compromised by soot, condensate, rust, corrosion, reductant (e.g., from reductant slip, from reductant crystallization, etc.), and other compounds found near internal combustion engines.

In view of the above shortcomings, a WHR system is provided that is capable of extracting heat from an exhaust system with a fluid that does not break down over time such that the fluid may remain stagnant and a three-way valve is not required. Implementations described herein relate to a WHR system that extracts otherwise wasted heat from an exhaust system using a thermal oil circuit. The thermal oil circuit contains a thermal oil that collects heat from the exhaust system. The thermal oil does not substantially break down over time and is capable of remaining stagnant relative to the exhaust system. As a result, the thermal oil circuit is not required to constantly circulate the thermal oil.

The WHR system described herein is able to provide an internal combustion engine with increased performance at a lower cost than conventional WHR systems because expensive components, such as the aforementioned three-way valve, utilized by conventional WHR systems are not necessary. Additionally, the WHR system described herein provides additional functionality not present in conventional WHR systems. The thermal oil circuit is capable of providing increased thermal storage compared to the fluid utilized by conventional WHR systems. As a result, the thermal oil circuit is able to account for thermal lags (i.e., that occur when the speed and temperature of exhaust gases changes rapidly, etc.) and excess heat produced by the exhaust gases (i.e., that occurs when an internal combustion engine is under load, etc.).

The WHR system described herein harnesses the wasted heat from the exhaust system to produce useful energy that can supplement an internal combustion engine. For example, an internal combustion engine may include an electric motor that is coupled to the WHR system and configured to receive electrical energy therefrom. When the WHR system harnesses the wasted heat, the WHR system may produce electrical energy (e.g., via an expander, etc.) that is transmitted to the electric motor. Because the thermal oil circuit is capable of providing thermal storage of the heat from the exhaust system, the WHR system can selectively provide the electrical energy to the electric motor at optimal times, such as when the internal combustion engine is subject to a relatively small load. In another example, the WHR system produces mechanical energy from the expander and that mechanical energy is transferred to the engine or other load absorbing device.

II. Overview of Waste Heat Recovery System

FIG. 1 depicts a WHR system 100 according to an example embodiment. The WHR system 100 is implemented in mobile vehicles (e.g., trucks, cars, transportation vehicles, construction vehicles, maritime vehicles, military vehicles, etc.). The WHR system 100 is operable to recover heat from an exhaust system 102 that includes an internal combustion engine 104 and an aftertreatment system 106. The internal combustion engine 104 provides exhaust gases through the exhaust system 102 to the aftertreatment system 106. The aftertreatment system 106 may be configured to remove particulates (e.g., pollutants, etc.) from the exhaust gases. The aftertreatment system 106 may include, for example, dosers (e.g., urea dosers, diesel exhaust fluid dosers, etc.), mixers (e.g., swirl mixers, centrifugal mixers, etc.), flow straighteners (e.g., axial flow straighteners, etc.), catalysts (e.g., for facilitating selective catalytic reduction ("SCR") processes, etc.), and other similar components and devices.

The WHR system 100 includes a first heat exchanger 108 positioned along the exhaust system 102 downstream of the aftertreatment system 106. The position of the first heat exchanger 108 along the exhaust system 102, downstream of the aftertreatment system 106, avoids undesirable ramifications associated with extracting heat upstream of the aftertreatment system 106. For example, the exhaust system 102 upstream of the aftertreatment system 106 may be at a substantially higher temperature than the exhaust system 102 downstream of the aftertreatment system 106.

The first heat exchanger 108 receives the exhaust gases and transfers heat (e.g., thermal energy, etc.) therefrom to a thermal oil (e.g., a first working fluid, etc.) within the first heat exchanger 108. The first heat exchanger 108 is a portion of a thermal oil circuit 110 and a portion of the exhaust system 102. The thermal oil circuit 110 harvests the heat from the exhaust gases for use within the WHR system 100. The thermal oil circuit 110 may be positioned along a tailpipe of the exhaust system 102.

The first heat exchanger 108 provides the thermal oil through an outlet 112 of the first heat exchanger 108 to a first conduit 114 (e.g., pipe, connector, tube, etc.). The first conduit 114 provides the thermal oil to a first inlet 116 of a second heat exchanger 118. The second heat exchanger 118 provides the heat from the thermal oil to a working fluid that is circulated within the second heat exchanger 118, separate from the thermal oil. The thermal oil is then provided from a first outlet 120 of the second heat exchanger 118 to a second conduit 122.

The second conduit 122 provides the thermal oil to a first valve 124 (e.g., fitting, manifold, valve, etc.) that provides the thermal oil to a third conduit 126 and a fourth conduit 128. The third conduit 126 provides the thermal oil to a first pump 130 (e.g., oil pump, etc.) that circulates the thermal oil within the thermal oil circuit 110. The first pump 130 provides the thermal oil to a fifth conduit 132 that provides the thermal oil to an inlet 134 of the first heat exchanger 108. The inlet 134 provides the thermal oil to the first heat exchanger 108 for circulation within the first heat exchanger 108, which subsequently provides the thermal oil to the outlet 112.

The fourth conduit 128 connects the first valve 124 and a reservoir 136. The reservoir 136 stores thermal oil, is selectively provided thermal oil by the first valve 124, and provides thermal oil to the first valve 124 that is selectively released to the second conduit 122 and/or the third conduit 126 by the first valve 124. For example, the first valve 124 may be controlled to fill the reservoir 136 with thermal oil or to empty the reservoir 136 of thermal oil. In another example, the first valve 124 may allow thermal oil to bypass the reservoir 136. The reservoir 136 also facilitates thermal expansion of the thermal oil. In this way, the reservoir 136 may assist the thermal oil circuit 110 in maintaining a target volume of thermal oil within the first heat exchanger 108, the second heat exchanger 118, and/or the first pump 130. The reservoir 136 may be constructed from thermally insulating material such that heat stored in the thermal oil within the reservoir 136 is substantially maintained. For example, the reservoir 136 may be vacuum insulated.

The thermal oil circuit 110 facilitates relatively low cost harvesting of otherwise wasted heat compared to conventional WHR systems. For example, the thermal oil circuit 110 may be utilized at a lower pressure than those utilized in conventional WHR systems using working fluid in the tailpipe exhaust heat exchanger. This may allow a portion of the WHR system 100 to be constructed from components with lower pressure ratings than those utilized in conventional WHR systems, providing a cost savings compared to these conventional systems.

Additionally, the thermal oil may withstand relatively high temperatures, such as those produced by the exhaust gases within the exhaust system 102, for relatively long periods of time compared to conventional WHR systems that utilize fluids which may break down (e.g., decompose, separate, deteriorate, etc.) over time when exposed to these temperatures. Because of the tendency of the working fluid to break down, conventional WHR systems constantly circulate the working fluid such that the working fluid does not sit stagnant within the heat exchanger. Conventional WHR systems also include exhaust gas bypass valves that can be opened to allow the exhaust gases to bypass a heat exchanger such that the exhaust gases bypasses the heat exchanger.

In contrast to the working fluid utilized by conventional WHR systems, the thermal oil utilized by the thermal oil circuit 110 does not substantially break down over time. As a result, the thermal oil circuit 110 does not need to constantly circulate the thermal oil as is done by conventional WHR systems with working fluid. For example, the thermal oil can sit stagnant within the first heat exchanger 108 until the first pump 130 is activated to cause the transfer of heat to the working fluid within the second heat exchanger 118. By sitting stagnant within the first heat exchanger 108, the thermal oil can collect large amounts of heat before being triggered by the first pump 130 to transfer the heat to the second heat exchanger 118. Additionally, the thermal oil circuit 110 does not include an exhaust gas bypass valve like that which is included within the conventional WHR systems. As a result, the WHR system 100 can be significantly less expensive than conventional WHR systems.

In addition to being a portion of the thermal oil circuit 110, the second heat exchanger 118 is a portion of an RC circuit 138 within which the working fluid, not the thermal oil, is circulated. Depending on the application, the working fluid may include, for example, water, glycol, hydrofluorocarbons, perfluorocarbons, and other similar fluids, alone or in any combination (e.g., water and glycol, etc.). The RC circuit 138 includes a first conduit 140 that receives the working fluid from a second outlet 142 of the second heat exchanger 118. In various embodiments the RC circuit 138 includes other waste heat sources 144, each including their own heat exchanger (not shown). The RC circuit 138 is configured to combine heat harvested from the other waste heat sources 144 with the heat in the working fluid.

From the waste heat sources 144, the RC circuit 138 provides the working fluid to a second conduit 146 that provides the working fluid to an expander 148. The expander 148 harnesses pressure within the working fluid to produce mechanical energy. The mechanical energy may be provided to, for example, an alternator for producing electrical energy. The electrical energy may be provided to a battery, fuel cell, capacitor, electrical system, power grid, or other similar electrical source.

From the expander 148, the working fluid is provided through a third conduit 150 to a condenser 152. The condenser 152 may function to condense the working fluid (e.g., from a gas to a liquid or saturated gas, etc.). In some embodiments, the RC circuit 138 further includes a subcooler (not shown) positioned downstream of the condenser 152. The subcooler further condenses (e.g., subcools, etc.) the working fluid. From the condenser 152, the working fluid is provided through a fourth conduit 154 to a second pump 156. The second pump 156 functions to circulate the working fluid within the RC circuit 138. The second pump 156 provides the working fluid to a fifth conduit 158 that provides the working fluid to a second inlet 160 of the second heat exchanger 118.

According to an example embodiment, the reservoir 136 is at least partially constructed from, or includes, a phase-change material. The phase-change material may change phases when enough heat is stored within the material. This change in phase allows the phase-change material to store additional heat. The phase-change material may be, for example, wax based. The phase-change material may also be organic (e.g., paraffin, etc.) based, inorganic (e.g., salt hydrate, metallic, aluminum, zinc, etc.) based, eutectic (e.g., inorganic-inorganic, etc.) based, or solid-solid based. In some applications, the thermal oil circuit 110 incorporates phase-change material within other components of the thermal oil circuit 110, such as the first heat exchanger 108, the first conduit 114, the second conduit 122, the first valve 124, the third conduit 126, the fourth conduit 128, and the fifth conduit 132. For example, the first conduit 114, the second conduit 122, the third conduit 126, the fourth conduit 128, and the fifth conduit 132 may be partially or completely lined with phase-change material. Through the use of the phase-change material, the thermal oil circuit 110 may store additional heat from the thermal oil.

The first heat exchanger 108 may receive any portion of the exhaust gases from the exhaust system 102. In many applications, the first heat exchanger 108 receives all of the exhaust gases (e.g., a full flow of exhaust, etc.) from the exhaust system 102. In other applications, the first heat exchanger 108 only receives a portion of the exhaust gases (e.g., a partial flow of exhaust, etc.) from the exhaust system 102. For example, the exhaust system 102 may include a valve that provides only a portion of the exhaust gases to the first heat exchanger 108 while providing the remaining portion downstream of the first heat exchanger 108 (i.e., directly to a tailpipe of the exhaust system 102, etc.).

With specific regard to automotive uses, the thermal oil circuit 110 provides the RC circuit 138 with additional heat compared to the heat provided by conventional WHR systems. Conventional WHR systems for automotive uses utilize coolant heat extraction and exhaust gas recirculation ("EGR") heat extraction. However, these conventional WHR systems do not extract heat using any system that is similar to the thermal oil circuit 110. The thermal oil circuit 110 may extract heat from the exhaust gases when a vehicle having the internal combustion engine 104 is at partial load, full load, or in a "cruise" condition.

The WHR system 100 may recover heat from various heat sources such as, for example, EGR systems, exhaust streams (e.g., high temperature exhaust, low temperature exhaust, etc.), cylinder heads, cylinder blocks, manifolds, oil systems, oil heaters, coolant circuits, charge air systems, high grade waste heat, low grade waste heat, and other similar sources, alone or in any combination. The WHR system 100 may extract the heat from these heat sources with the first heat exchanger 108 in series, in parallel, or in a combination thereof. The WHR system 100 may also incorporate a recuperator in parallel, in series, or in a combination thereof.

In an example embodiment, the thermal oil circuit 110 further includes a sensor 162 positioned on the second heat exchanger 118 and configured to measure the temperature of the thermal oil within the second heat exchanger 118. The sensor 162 may be utilized to control the first pump 130 based on the temperature of the thermal oil within the thermal oil circuit 110. In other applications, the sensor 162, or an additional sensor similar to the sensor 162, may be incorporated within various locations within the thermal oil circuit 110, such as the first heat exchanger 108, the first conduit 114, the second conduit 122, the first valve 124, the third conduit 126, the fourth conduit 128, the fifth conduit 132, and the reservoir 136.

The thermal oil may be any suitable thermal fluid, hot oil, oil, heat transfer fluid, or other similar fluid. For example, the thermal oil may be petroleum based, mineral oil based, polyglycol based, or glycol based. In some applications, the thermal oil may be Paratherm OR®, Paratherm HR™, Paratherm NF®, Santolube® OS-138, or other similar fluids.

Figure 2:
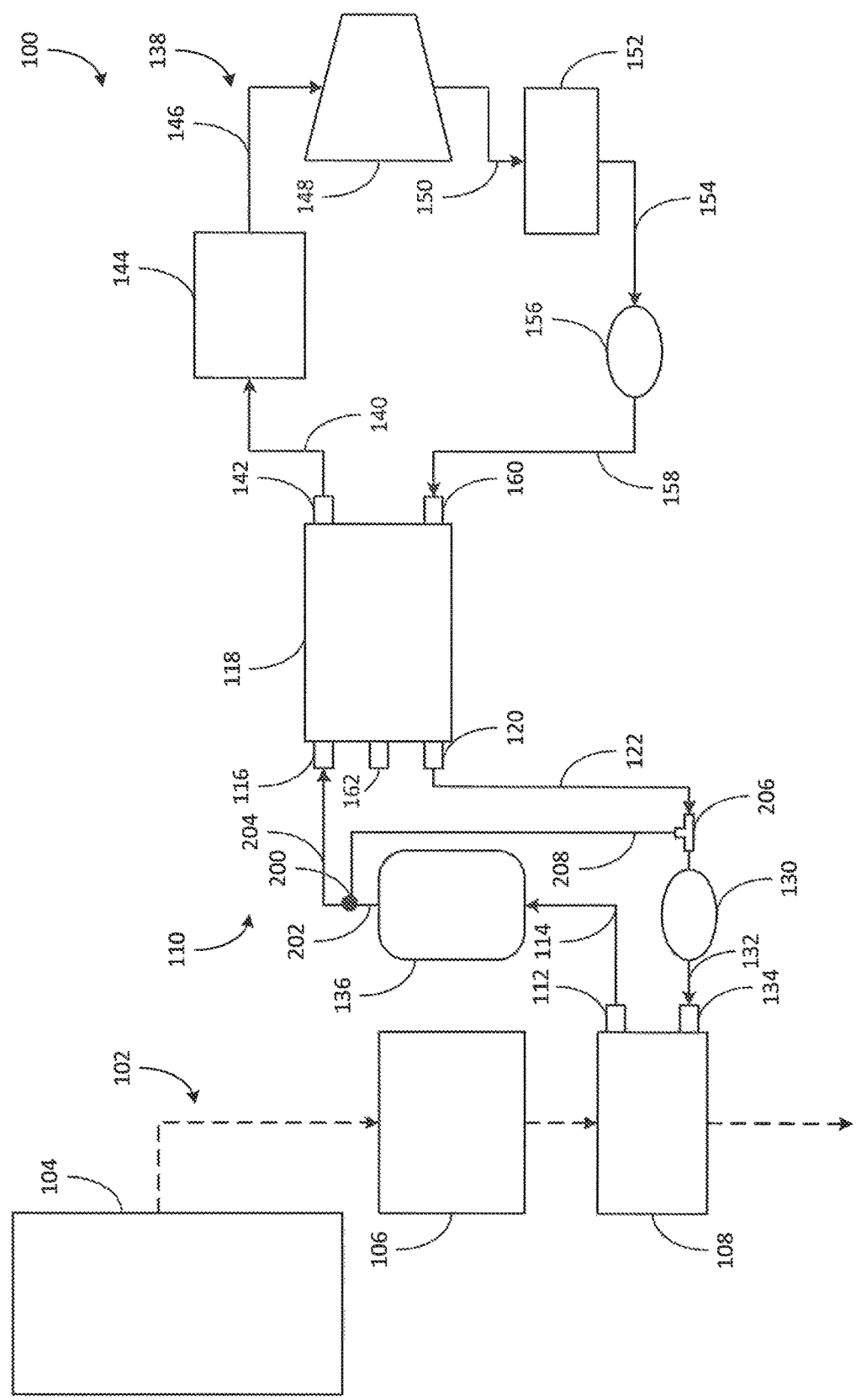
FIG. 2 is a block schematic diagram of another example WHR system having another example thermal oil circuit.

FIG. 2 depicts the WHR system 100 according to another example embodiment. As shown in FIG. 2, the outlet 112 of the first heat exchanger 108 provides the thermal oil to the reservoir 136. From the reservoir 136, the thermal oil is provided to a second valve 200 (e.g., fitting, manifold, valve, etc.) via a sixth conduit 202. The second valve 200 provides the thermal oil to the first inlet 116 of the second heat exchanger 118 via a seventh conduit 204 and to a junction 206 (e.g., fitting, manifold, valve, etc.) via an eighth conduit 208. The second valve 200 also receives thermal oil from the first outlet 120 of the second heat exchanger 118 and provides thermal oil to the first pump 130, which further provides the thermal oil to the inlet 134 of the first heat exchanger 108. The embodiment of the WHR system 100 shown in FIG. 2 may be particularly advantageous because the reservoir 136 provides increased and/or enhanced storage of heat from the thermal oil because it receives the thermal oil directly from the first heat exchanger 108.

The reservoir 136 is selectively provided thermal oil by the second valve 200, provides thermal oil to the second valve 200 that is selectively released to the seventh conduit 204 and/or the eighth conduit 208, and/or provides thermal oil to the first conduit 114. For example, the second valve 200 may be controlled to fill the reservoir 136 with thermal oil or to empty the reservoir 136 of thermal oil. In another example, the second valve 200 may allow thermal oil to bypass the reservoir 136.

Figure 3:
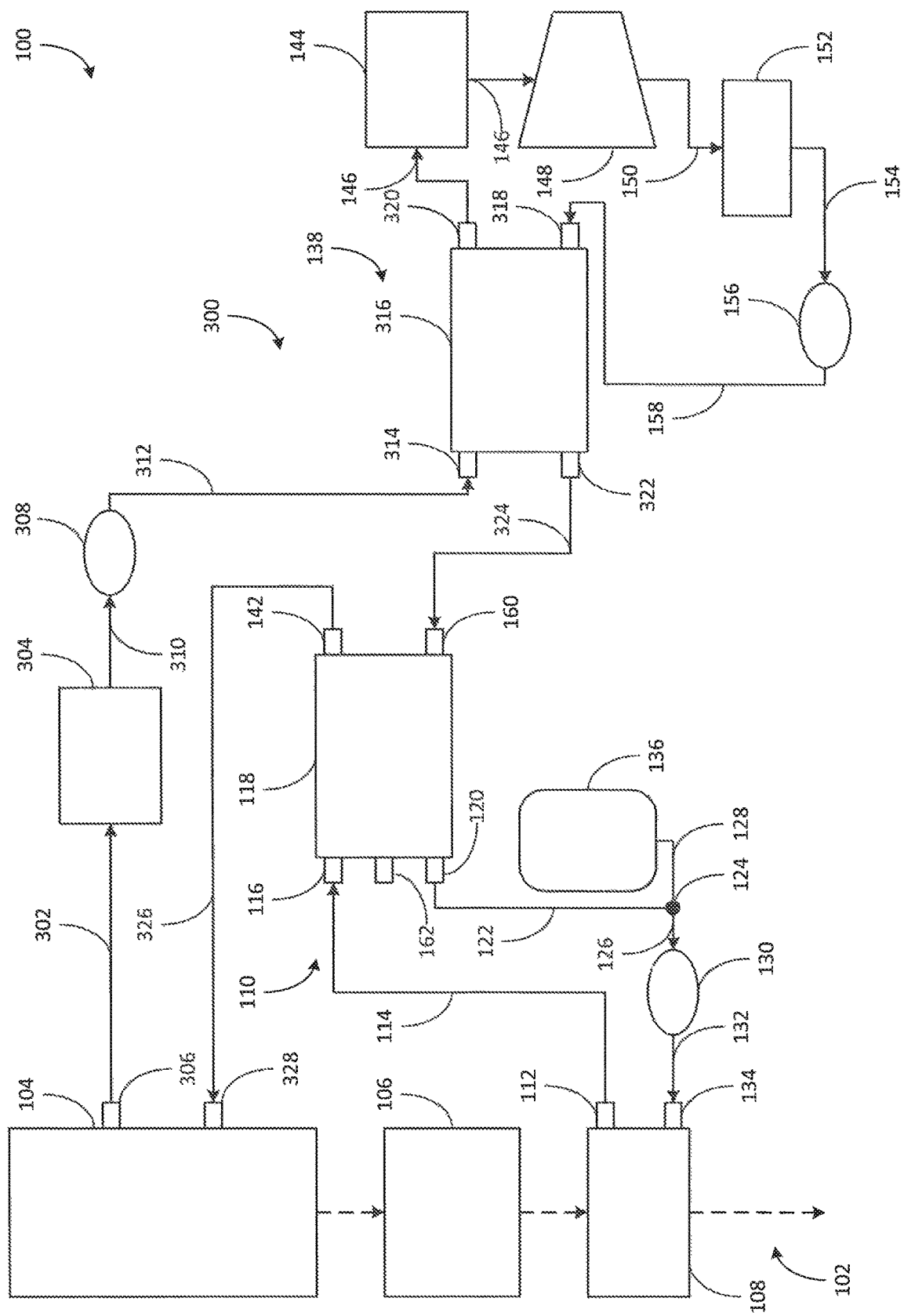
FIG. 3 is a block schematic diagram of yet another example WHR system having yet another example thermal oil circuit.

FIG. 3 depicts the WHR system 100 according to yet another example embodiment. As shown in FIG. 3, the WHR system 100 includes a coolant circuit 300. The coolant circuit 300 circulates a coolant (e.g., working fluid, antifreeze, glycol, etc.) to the internal combustion engine 104. In an example embodiment, the coolant circuit 300 includes a first conduit 302 that provides the coolant to a radiator 304 from an outlet 306 of the internal combustion engine 104. The coolant may be provided to the radiator 304 as a liquid. The radiator 304 functions to selectively reject heat, causing a reduction in the temperature of the coolant prior to the coolant being provided to the internal combustion engine 104. When the radiator 304 functions to reduce the temperature of the coolant, the radiator 304 may provide the coolant as a liquid. The radiator 304 may, for example, reject approximately eighty-five percent of the heat provided to the radiator 304. For example, the radiator 304 may receive coolant at one-hundred and ten degrees Celsius and provide the coolant at a reduced temperature.

The radiator 304 may intentionally not reduce the temperature of the coolant when the internal combustion engine 104 is in a "warm-up" period. While the radiator 304 is not reducing the temperature of the coolant, the coolant, which has been previously heated by the second heat exchanger 118 via the thermal oil, may provide heating to coolant, which is transferred to the internal combustion engine 104 to assist the internal combustion engine 104 in obtaining a target operating temperature. In this way, the WHR system 100 may preheat the internal combustion engine 104 by selectively not using the radiator 304 to reduce the temperature of the coolant. For example, the radiator 304 may include a valve that allows the coolant to circumvent the radiator 304 and flow directly from the first conduit 302 to the second conduit 310. However, once the internal combustion engine 104 has reached the target operating temperature, the radiator 304 functions to reduce the temperature of the coolant such that the coolant can provide cooling to the internal combustion engine 104, thereby allowing the internal combustion engine 104 to substantially maintain the target operating temperature.

The coolant circuit 300 may additionally or alternatively heat different components, such as a fuel tank, fuel line, or glow plug to facilitate de-gelling of fuel (e.g., diesel fuel, etc.). For example, various circuits may receive the coolant from a location that is directly upstream of the radiator 304, divert the coolant to these components, and return the coolant to the radiator 304.

The radiator 304 provides the coolant to a third pump 308 via a second conduit 310. The radiator 304 may be configured to reduce the temperature of the coolant such that the third pump 308 is continuously provided liquid coolant. The third pump 308 provides the coolant to a third conduit 312 that is connected to a first inlet 314 of a third heat exchanger 316. The third heat exchanger 316 facilitates the transfer of heat from the coolant to the working fluid within the RC circuit 138. In this way, the coolant circuit 300 is used to facilitate indirect heat transfer between the thermal oil circuit 110 and the RC circuit 138.

The RC circuit 138 interacts with the coolant circuit 300 as previously described with the thermal oil circuit 110. The RC circuit 138 provides the working fluid to a second inlet 318 on the third heat exchanger 316 and receives the working fluid from a first outlet 320 on the third heat exchanger 316. The third heat exchanger 316 also provides the coolant from a second outlet 322 and through a fourth conduit 324 to the second inlet 160 of the second heat exchanger 118. In many applications, the coolant is provided to the first inlet 314 at a first temperature, and the coolant is provided from the second outlet 322 at a second temperature that is less than the first temperature. The coolant then flows through the second heat exchanger 118 and out of the second outlet 142 into a fifth conduit 326, which provides the coolant to an inlet 328 of the internal combustion engine 104. In many applications, the coolant is provided to the second inlet 160 at a third temperature, and the coolant is provided from the second outlet 142 at a fourth temperature that is greater than the third temperature. The coolant circulates within the internal combustion engine 104 between the inlet 328 and the outlet 306. This circulation causes cooling to be provided to the internal combustion engine 104 and causes the temperature of the coolant to increase. The cooling provided to the internal combustion engine 104 may increase the efficiency and/or maintain the structural integrity of the internal combustion engine 104.

In other embodiments the radiator 304 may be located at different locations within, or integrated within various components of, the coolant circuit 300. For example, in some embodiments, the radiator 304 receives the coolant from the second outlet 322 of the third heat exchanger 316 and provides the coolant to the second inlet 160 of the second heat exchanger 118. In other embodiments, the radiator 304 receives refrigerant from the second outlet 142 of the second heat exchanger 118 and provides the coolant to the inlet 328 of the internal combustion engine 104.

Similarly, the third pump 308 may be located at different locations within, or integrated within various components of, the coolant circuit 300. For example, the third pump 308 may be positioned along any of the first conduit 302, the second conduit 310, the third conduit 312, the fourth conduit 324, and the fifth conduit 326. The third pump 308 may also be incorporated within the internal combustion engine 104 (i.e., as a water pump, etc.), the radiator 304, the second heat exchanger 118, and the third heat exchanger 316.

In some embodiments, the WHR system 100 is controlled to intentionally extract only a portion of the heat produced by the exhaust gases using the thermal oil circuit 110. In these embodiments, extracting all of the heat produced by the exhaust gases within the first heat exchanger 108 may be undesirable because, for example, the coolant circuit 300 would be significantly taxed by having to decrease the temperature of the coolant, which is heated by the thermal oil within the second heat exchanger 118, from a relatively high temperature such that the target operating temperature of the internal combustion engine 104 is maintained.

In some embodiments, the coolant circuit 300 includes a gas and liquid separator upstream of the third pump 308. The gas and liquid separator may allow the gas to bypass the third pump 308, or be rerouted to the radiator 304, such that only liquid is provided to the third pump 308. In this way, the desirability of the third pump 308 may be increased.

The configuration of the coolant circuit 300 shown in FIG. 3 may be advantageous because the heat from the thermal oil is transferred to the coolant, which is then directly transferred to the internal combustion engine 104 such that the internal combustion engine 104 substantially receives the heat from the thermal oil.

Figure 4:
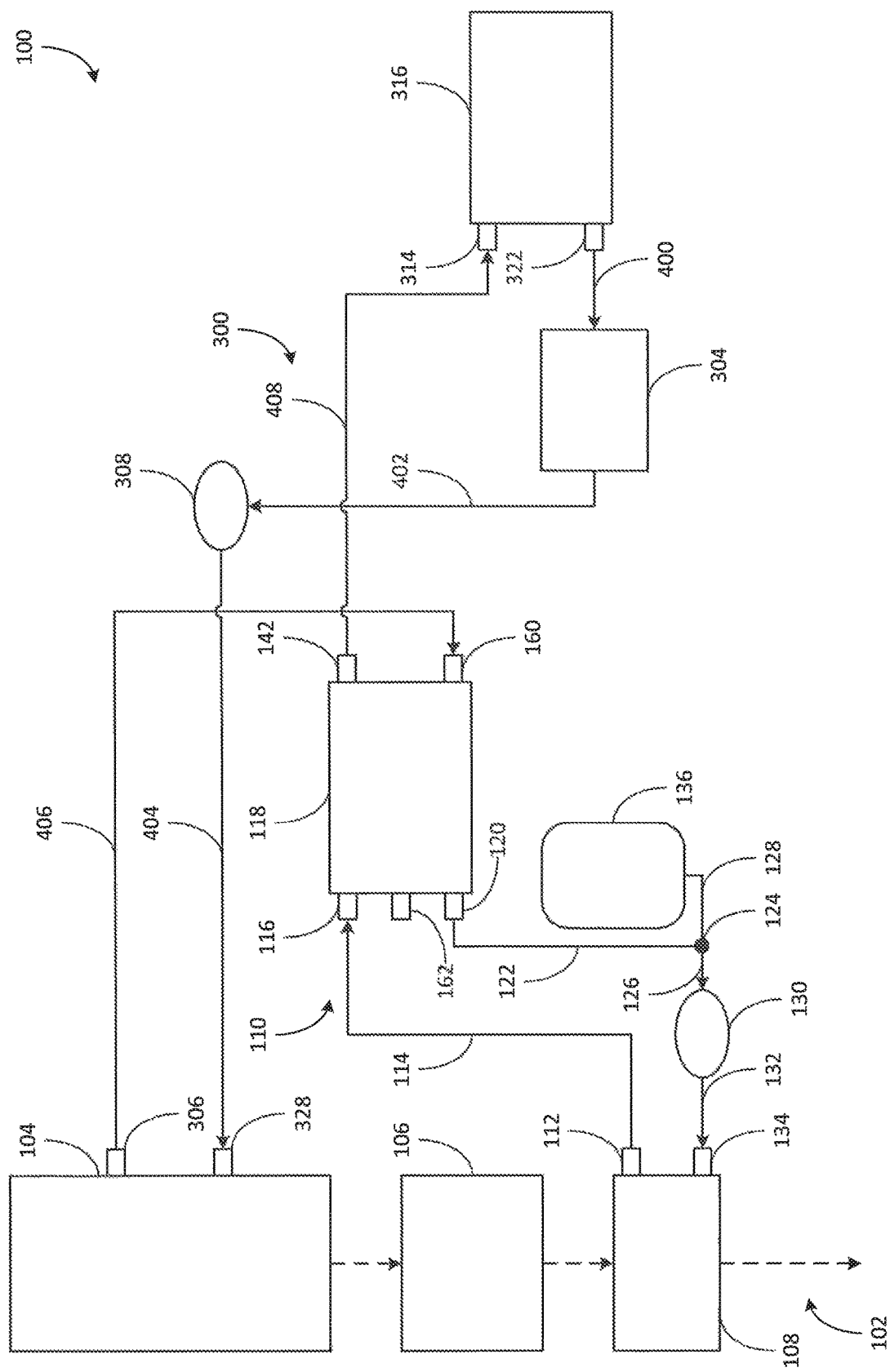
FIG. 4 is a block schematic diagram of yet another example WHR system having yet another example thermal oil circuit.

FIG. 4 depicts the WHR system 100 according to yet another example embodiment. As shown in FIG. 4, the coolant circuit 300 has been reconfigured such that the third heat exchanger 316 provides coolant through the second outlet 322 to the radiator 304 via a first conduit 400. The radiator 304 then provides the coolant through a second conduit 402 to the third pump 308. The third pump 308 then, if not incorporated within the internal combustion engine 104, provides the coolant through a third conduit 404 to the inlet 328 of the internal combustion engine 104. The internal combustion engine 104 then provides the coolant through the outlet 306 to a fourth conduit 406 which provides the coolant to the second inlet 160 of the second heat exchanger 118. The second heat exchanger 118 then provides the coolant through the second outlet 142 to a fifth conduit 408 which provides the coolant to the first inlet 314 of the third heat exchanger 316.

The configuration of the coolant circuit 300 shown in FIG. 4 may be advantageous because the heat from the thermal oil is transferred to the coolant which is then directly transferred to the third heat exchanger 316 such that the working fluid substantially receives the heat from the thermal oil.

Figure 5:
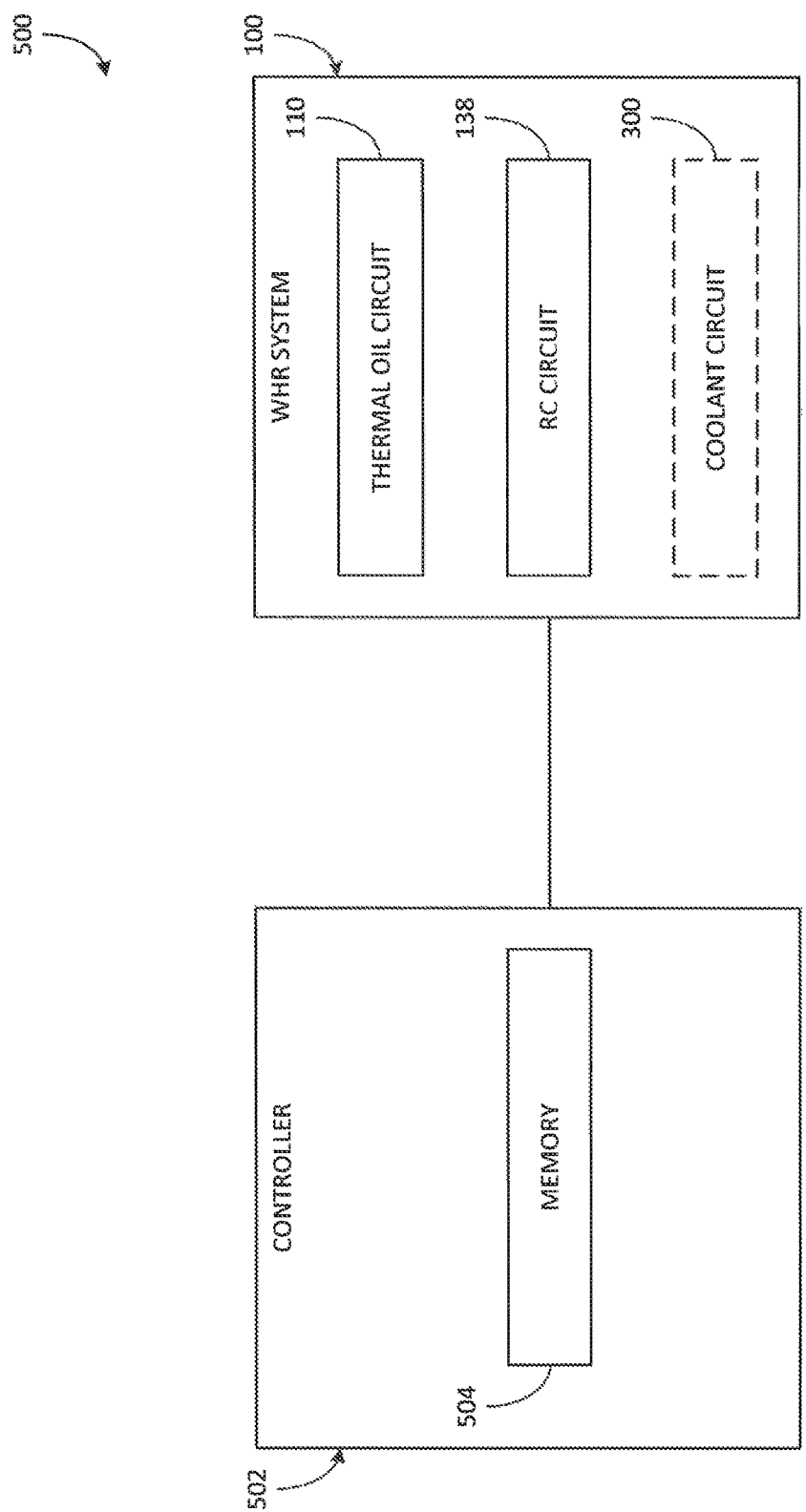
FIG. 5 is a block diagram of an example control system for a waste heat recovery system having an example thermal oil circuit.

FIG. 5 depicts a control system 500 for the WHR system 100 according to an example embodiment. As shown in FIG. 5, the control system 500 includes a controller 502. The WHR system 100, including the thermal oil circuit 110, the RC circuit 138, and, in some embodiments, the coolant circuit 300, is electrically or communicatively coupled to the controller 502. The controller 502 is configured to control the thermal oil circuit 110, the RC circuit 138, and/or the coolant circuit 300 to extract and utilize heat from the exhaust system 102. The controller 502 may include a microprocessor, an application-specific integrated circuit ("ASIC"), a field-programmable gate array ("FPGA"), etc., or combinations thereof. The controller 502 includes a memory 504, which may include, but is not limited to, electronic, optical, magnetic, or any other storage or transmission device capable of providing a processor, ASIC, FPGA, etc. with program instructions. The memory 504 may include a memory chip, Electrically Erasable Programmable Read-Only Memory ("EEPROM"), Erasable Programmable Read Only Memory ("EPROM"), flash memory, or any other suitable memory from which the controller 502 can read instructions. The instructions may include code from any suitable programming language.

The control system 500 determines a load on the internal combustion engine 104 and compares the load to thresholds to determine if the control system 500 is experiencing a relatively small load, such as may occur during a "cruise" condition or an "idle" condition. When the control system 500 determines that the internal combustion engine 104 is experiencing a relatively small load, the control system 500 circulates thermal fluid within the thermal fluid circuit 110 to cause the heat produced by the exhaust system 102 to be transferred to the RC circuit 138. For example, the first pump 130 may be turned on. Additionally, the first valve 124 or the second valve 200 may cause the reservoir 136 to supply thermal fluid to the thermal fluid circuit 110 in response to determining that the internal combustion engine 104 is experiencing a relatively small load.

The control system 500 also compares the load to thresholds to determine if the control system 500 is experiencing a relatively large load, such as may occur during a high speed or high torque condition. When the control system 500 determines that the internal combustion engine 104 is experiencing a relatively large load, the control system 500 may cease to circulate thermal fluid within the thermal fluid circuit 110 thereby preventing the heat from being produced by the exhaust system 102 being transferred to the RC circuit 138. For example, the first pump 130 may be turned off. Additionally, the first valve 124 or the second valve 200 may cause the reservoir 136 to be filled with thermal fluid from the thermal fluid circuit 110 in response to determining that the internal combustion engine 104 is experiencing a relatively large load.

The control system 500 functions to control the first pump 130 (e.g., turn on the first pump 130, turn off the first pump 130, cycle the first pump 130, etc.). The control system 500 also functions to control the first valve 124 or the second valve 200. In an example embodiment, the control system 500 functions to control the first pump 130, the first valve 124, and/or the second valve 200 when a temperature within the exhaust system 102, the thermal fluid circuit 110, the RC circuit 138, and/or the coolant circuit 300 is below a threshold (e.g., a minimum temperature, etc.) or above a threshold (e.g., a maximum temperature, etc.). In another embodiment, the control system 500 functions to control the first pump 130, the first valve 124, and/or the second valve 200 when the temperature of the internal combustion engine 104 is below a threshold (e.g., a target operating temperature, etc.) or above a threshold (e.g., a maximum temperature, etc.). The control system 500 may also be controlled to optimize heat extraction from the exhaust system 102.

In some applications, the control system 500 controls the first pump 130, the first valve 124, and/or the second valve 200 based on operating characteristics (e.g., rotations per minute of a crankshaft, torque produced at the crankshaft, etc.) of the internal combustion engine 104. For example, the control system 500 may control the first pump 130 to pump the thermal oil at a speed that is directly related to a rotational speed of a crankshaft of the internal combustion engine 104. The control system 500 may also control the first pump 130, the first valve 124, and/or the second valve 200 based on a fan speed (e.g., high, medium, low, on, off, etc.) of a fan associated with the internal combustion engine 104. The control system 500 may also control the first pump 130, the first valve 124, and/or the second valve 200 based on an operational status (e.g., high, medium, low, on, off, etc.) of an air conditioning system associated with the internal combustion engine 104.

In other applications, the control system 500 controls the first pump 130, the first valve 124, and/or the second valve 200 based on a temperature within the exhaust system 102, such as would be measured by a sensor positioned downstream of the aftertreatment system 106. For example, the first pump 130 could pump the thermal oil more quickly when the exhaust system 102 is at a relatively higher temperature (e.g., above a first threshold, etc.), where a relatively greater opportunity for harvesting the heat from the exhaust system 102 exists, and more slowly when the exhaust system 102 is at a relatively lower temperature (e.g., below a second threshold, etc.).

In still other applications, the control system 500 controls the first pump 130, the first valve 124, and/or the second valve 200 based on high side pressure, low side pressure, and superheat within RC circuit 138. The control system 500 may, for example, control the first pump 130, the first valve 124, and/or the second valve 200 based on the inlet temperature of the expander 148.

According to various embodiments, the thermal oil circuit 110 includes a sensor (e.g., the sensor 162, etc.) that senses a temperature of the thermal oil. The sensor 162 is electrically or communicatively coupled to the controller 502. The control system 500 may control the first pump 130, the first valve 124, and/or the second valve 200 based on the temperature of the thermal oil within the thermal oil circuit 110, as sensed by the sensor 162.

The control system 500 may also control the first pump 130, the first valve 124, and/or the second valve 200 such that the first pump 130, the first valve 124, and/or the second valve 200 is turned off when a temperature within the RC circuit 138, such as a temperature of the working fluid within the second heat exchanger 118, is above a threshold (e.g., a maximum temperature, etc.). The control system 500 may also be controlled to optimize heat extraction from the exhaust system 102.

Additionally, the control system 500 may control the first valve 124 or the second valve 200 to cause the reservoir to empty thermal fluid such that additional thermal fluid is available to the second heat exchanger 118 thereby providing more heat to the RC circuit 138. The first valve 124 and the second valve 200 may be controlled by the control system 500 as the first pump 130 previously described.

While the foregoing description of the control system 500 is discussed with reference to the first pump 130, it is understood that the second pump 156 and the third pump 308 may be similarly controlled by the control system 500. Further, it is understood that the control system 500 may be configured to control any components within the exhaust system 102, the thermal oil circuit 110, the RC circuit 138, and the cooling circuit 300 as shown and described with reference to FIGS. 1-4.

The WHR system 100 may additionally or alternatively heat different components, such as a fuel tank, fuel line, or glow plug to facilitate de-gelling of fuel (e.g., diesel fuel, etc.). The control system 500 may communicate with various external systems, circuits, and devices. For example, the control system 500 may communicate with an engine control module or unit. While the WHR system 100 has been described with relation to a mobile vehicle, it is understood that the WHR system 100 may be similarly implemented in other applications having an internal combustion engine (e.g., generators, gensets, etc.).

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another. Examples of connections or configurations for connecting may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A waste heat recovery system, comprising:
   an exhaust system configured to treat exhaust gases;
   a thermal oil circuit comprising:
      a first heat exchanger positioned along the exhaust system, the first heat exchanger receiving heat from the exhaust gases and separately receiving thermal oil such that heat from the exhaust gases is transferred to the thermal oil within the first heat exchanger;
      a second heat exchanger that receives the thermal oil from the first heat exchanger; and
      a reservoir configured to receive the thermal oil from the second heat exchanger and to provide the thermal oil to the first heat exchanger; and
   a Rankine cycle circuit that circulates working fluid through the second heat exchanger separate from the thermal oil such that heat from the thermal oil within the second heat exchanger is transferred to the working fluid, the Rankine cycle circuit comprising an expander that utilizes heat within the working fluid to produce mechanical energy.

2. The waste heat recovery system of claim 1, wherein the thermal oil circuit further comprises a valve; and
   wherein the valve is controlled to provide the thermal oil to the reservoir and to provide the thermal oil from the reservoir.

3. The waste heat recovery system of claim 2, further comprising a control system communicable with an internal combustion engine with which the waste heat recovery system is associated, the control system configured to:
   determine if the internal combustion engine is experiencing a small load;
   determine if the internal combustion engine is experiencing a large load;
   cause the valve to provide the thermal oil to the reservoir in response to determining that the internal combustion engine is experiencing a large load; and
   cause the valve to provide the thermal oil from the reservoir in response to determining that the internal combustion engine is experiencing a small load.

4. The waste heat recovery system of claim 1, wherein the Rankine cycle circuit is configured to combine heat harvested from other waste heat sources with heat in the working fluid.

5. A thermal oil circuit for a waste heat recovery system, the thermal oil circuit comprising:
   a first heat exchanger positioned along an exhaust system, the first heat exchanger receiving heat from the exhaust system and separately receiving thermal oil such that heat from the exhaust system is transferred to the thermal oil within the first heat exchanger;
   a first conduit coupled to the first heat exchanger;
   a second heat exchanger coupled to the first conduit, the second heat exchanger receiving the thermal oil from the first heat exchanger via the first conduit, the second heat exchanger separately receiving working fluid such that heat from the thermal oil within the second heat exchanger is transferred to the working fluid;
   a second conduit coupled to the second heat exchanger;
   a valve coupled to the second conduit;
   a third conduit coupled to the valve and to the first heat exchanger such that the thermal oil can be provided from the second heat exchanger, through the second conduit, the valve, and the third conduit;
a fourth conduit coupled to the valve; and
a reservoir coupled to the valve, the reservoir configured to store thermal oil,
wherein the valve is operable between:
a first state where the thermal oil is provided to the reservoir;
a second state where the thermal oil is not provided to the reservoir or provided from the reservoir; and
a third state where the thermal oil is provided from the reservoir.

6. A waste heat recovery system, comprising:
an exhaust system receiving exhaust gases from an internal combustion engine;
a thermal oil circuit comprising:
a first heat exchanger receiving exhaust gases from the exhaust system and separately receiving thermal oil such that heat from the exhaust gases is transferred to the thermal oil within the first heat exchanger; and
a second heat exchanger receiving the thermal oil from the first heat exchanger and providing the thermal oil to the first heat exchanger;
a coolant circuit comprising:
a radiator receiving coolant from the internal combustion engine and providing the coolant to a third heat exchanger; and
the third heat exchanger providing the coolant to the second heat exchanger such that heat from the thermal oil within the second heat exchanger is transferred to the coolant; and
a Rankine cycle circuit comprising:
a pump configured to circulate working fluid through the third heat exchanger such that heat from the coolant within the third heat exchanger is transferred to the working fluid; and
an expander that utilizes heat within working fluid to produce mechanical energy.

7. The waste heat recovery system of claim 6, wherein the radiator is configured to not reduce the temperature of the coolant in response to the internal combustion engine operating below a target operating temperature.

8. The waste heat recovery system of claim 6, wherein the exhaust system further includes an aftertreatment system, the aftertreatment system configured to treat the exhaust gases before the exhaust gases enter the first heat exchanger.

9. The waste heat recovery system of claim 6, wherein the Rankine cycle circuit is configured to combine heat harvested from other waste heat sources with heat in the working fluid.

10. The waste heat recovery system of claim 6, wherein the thermal oil circuit further comprises a valve and a reservoir, the reservoir configured to selectively store thermal oil,
wherein the valve is controlled to selectively provide thermal oil to the reservoir and to selectively provide thermal oil from the reservoir.

11. The waste heat recovery system of claim 10, wherein the reservoir is positioned to receive thermal oil from the first heat exchanger.

12. The waste heat recovery system of claim 10, further comprising a control system communicable with the internal combustion engine with which the waste heat recovery system is associated, the control system configured to:
determine if the internal combustion engine is experiencing a small load;
determine if the internal combustion engine is experiencing a large load;
cause the valve to provide the thermal oil to the reservoir in response to determining that the internal combustion engine is experiencing a large load; and
cause the valve to provide the thermal oil from the reservoir in response to determining that the internal combustion engine is experiencing a small load.

13. A waste heat recovery system, comprising:
an exhaust system receiving exhaust gases from an internal combustion engine;
a thermal oil circuit comprising:
a first heat exchanger receiving exhaust gases from the exhaust system and separately receiving thermal oil such that heat from the exhaust gases is transferred to the thermal oil within the first heat exchanger; and
a second heat exchanger receiving the thermal oil from the first heat exchanger and providing the thermal oil to the first heat exchanger;
a coolant circuit comprising:
a radiator configured to receive coolant from the internal combustion engine; and
a third heat exchanger configured to receive the coolant from the radiator and to provide the coolant to the second heat exchanger; and
a Rankine cycle circuit comprising:
a pump configured to provide working fluid to the third heat exchanger and to circulate the working fluid through the third heat exchanger such that heat from the coolant within the third heat exchanger is transferred to the working fluid; and
an expander configured to receive the working fluid from the third heat exchanger and that utilizes heat within the working fluid to produce mechanical energy;
wherein the second heat exchanger is configured to transfer heat between the thermal oil and the coolant.

14. The waste heat recovery system of claim 13, wherein the radiator is configured to not reduce the temperature of the coolant in response to the internal combustion engine operating below a target operating temperature.

15. The waste heat recovery system of claim 13, wherein the exhaust system further includes an aftertreatment system, the aftertreatment system configured to treat the exhaust gases before the exhaust gases enter the first heat exchanger.

16. The waste heat recovery system of claim 13, wherein the Rankine cycle circuit is configured to combine heat harvested from other waste heat sources with heat in the working fluid.

17. The waste heat recovery system of claim 13, wherein the thermal oil circuit further comprises a valve and a reservoir, the reservoir configured to selectively store the thermal oil,
wherein the valve is controlled to selectively provide the thermal oil to the reservoir and to selectively provide the thermal oil from the reservoir.

18. The waste heat recovery system of claim 17, wherein the reservoir is positioned to receive the thermal oil from the first heat exchanger.

19. The waste heat recovery system of claim 17, further comprising a control system communicable with the internal combustion engine with which the waste heat recovery system is associated, the control system configured to:
determine if the internal combustion engine is experiencing a small load;

determine if the internal combustion engine is experiencing a large load;

cause the valve to provide the thermal oil to the reservoir in response to determining that the internal combustion engine is experiencing a large load; and cause the valve to provide the thermal oil from the reservoir in response to determining that the internal combustion engine is experiencing a small load.

\* \* \* \* \*